United States Patent
Nagarajan et al.

(10) Patent No.: US 10,142,239 B2
(45) Date of Patent: Nov. 27, 2018

(54) SYNCHRONIZING MULTICAST STATE BETWEEN MULTI-HOMED ROUTERS IN AN ETHERNET VIRTUAL PRIVATE NETWORK

(71) Applicant: Juniper Networks, Inc., Sunnyvale, CA (US)

(72) Inventors: Vikram Nagarajan, Bangalore (IN); Levinh Hoang, Sunnyvale, CA (US); John E. Drake, Pittsburgh, PA (US); Kapil Arora, Bangalore (IN); Princy T. Elizabeth, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 96 days.

(21) Appl. No.: 15/444,005

(22) Filed: Feb. 27, 2017

(65) Prior Publication Data
US 2018/0248803 A1 Aug. 30, 2018

(51) Int. Cl.
| | | |
|---|---|---|
| *H04L 12/28* | (2006.01) | |
| *H04L 12/801* | (2013.01) | |
| *H04L 12/761* | (2013.01) | |
| *H04L 12/24* | (2006.01) | |
| *H04L 12/725* | (2013.01) | |

(52) U.S. Cl.
CPC ............ *H04L 47/18* (2013.01); *H04L 45/16* (2013.01); *H04L 41/085* (2013.01); *H04L 45/30* (2013.01)

(58) Field of Classification Search
None
See application file for complete search history.

(56) References Cited

U.S. PATENT DOCUMENTS

| | | | |
|---|---|---|---|
| 8,391,303 B2 * | 3/2013 | Li | ............................ H04L 45/04 370/254 |
| 2015/0055662 A1 | 2/2015 | Bhagavathiperumal et al. | |

(Continued)

FOREIGN PATENT DOCUMENTS

EP 3013006 A1 4/2016

OTHER PUBLICATIONS

U.S. Appl. No. 15/083,732, by Juniper Networks, Inc. (Inventors: Wen Lin et al.), filed Mar. 29, 2016.

(Continued)

*Primary Examiner* — Bob A Phunkulh
(74) *Attorney, Agent, or Firm* — Shumaker & Sieffert, P.A.

(57) ABSTRACT

Techniques are disclosed for handling withdrawals of Border Gateway Protocol (BGP) join synch routes used to synchronize multicast group join requests. In one example, a first provider edge (PE) router of a plurality of PE routers on an Ethernet segment of an Ethernet Virtual Private Network (EVPN) receives, from a second PE router, a withdrawal of a BGP join synch route. In response, the first PE router determines whether a disruption event or a multicast state timeout event at the second PE router caused the withdrawal. If the disruption event caused the withdrawal, the first PE router retains a multicast state for the multicast group and forwards multicast traffic for the multicast group to a customer edge (CE) router multi-homed to the plurality of the PE routers. If the multicast state timeout event caused the withdrawal, the first PE router deletes the multicast state and stops forwarding the multicast traffic.

24 Claims, 4 Drawing Sheets

(56) References Cited

U.S. PATENT DOCUMENTS

| | | | |
|---|---|---|---|
| 2016/0308767 A1* | 10/2016 | Borgione | H04L 45/745 |
| 2017/0026233 A1* | 1/2017 | Boutros | H04L 41/0806 |
| 2018/0006995 A1* | 1/2018 | Bickhart | H04L 12/4625 |
| 2018/0034648 A1* | 2/2018 | Nagarajan | H04L 7/0079 |
| 2018/0167315 A1* | 6/2018 | Kanjariya | H04L 45/50 |
| 2018/0183654 A1* | 6/2018 | Patel | H04L 41/0654 |

OTHER PUBLICATIONS

Sajassi et al., "BGP MPLS-Based Ethernet VPN," Internet Engineering Task Force (IETF), RFC 7432, Feb. 2015, 56 pp.

Deering, "Host Extensions for IP Multicasting," Network Working Group, RFC 1112, Aug. 1989, 17 pp.

Fenner, "Internet Group Management Protocol, Version 2," Network Working Group, RFC 2236, Nov. 1997, 24 pp.

Cain et al., "Internet Group Management Protocol, Verion 3," Network Working Group, RFC 3376, Oct. 2002, 53 pp.

Holbrook et al., "Using Internet Group Management Protocol 3(IGMv3) and Multicast Listener Discovery Protocol Version 2 (MLDv2) for Source-Specific Multicast," Network Working Group, RFC 4604, Aug. 2006, 11 pp.

IEEE 802.1AX Standards, "IEEE Standard for Local and Metropolitan Area Networks—Link Aggregation," IEEE Computer Society, Nov. 3, 2008, 163 pp.

Sajassi et al., "IGMP and MLD Proxy for EVPN, draft-sajassi-bess-evpn-igmp-mld-proxy-01," Internet-Draft, BESS Working Group, Oct. 28, 2016, 25 pp.

Extended Search Report from counterpart European Application No. 17198869.4, dated Feb. 9, 2018, 9 pp.

\* cited by examiner

SYNCHRONIZING MULTICAST STATE BETWEEN MULTI-HOMED ROUTERS IN AN ETHERNET VIRTUAL PRIVATE NETWORK

TECHNICAL FIELD

This disclosure generally relates to computer networks.

BACKGROUND

A computer network is a collection of interconnected computing devices that can exchange data and share resources. Example computing devices include routers, switches, and other layer two (L2) network devices that operate within layer two of the Open Systems Interconnection (OSI) reference model, i.e., the data link layer, and layer three (L3) network devices that operate within layer three of the OSI reference model, i.e., the network layer. Network devices within computer networks often include a control unit that provides control plane functionality for the network device and forwarding components for routing or switching data units.

An Ethernet Virtual Private Network (EVPN) may be used to extend two or more remote L2 customer networks through an intermediate L3 network (e.g., a provider network), in a transparent manner, i.e., as if the intermediate L3 network does not exist. In particular, the EVPN transports L2 communications, such as Ethernet packets or "frames," between customer networks via the intermediate L3 network. In a typical configuration, provider edge (PE) network devices (e.g., routers and/or switches) of the provider network coupled to customer edge (CE) network devices of the customer networks define label switched paths (LSPs) within the provider network to carry encapsulated L2 communications as if these customer networks were directly attached to the same local area network (LAN). In some configurations, the PE network devices may also be connected by Internet Protocol (IP) infrastructure in which case IP/Generic Routing Encapsulation (GRE) tunneling or other IP tunneling can be used between the PE network devices.

SUMMARY

In general, the disclosure describes techniques for synchronizing multicast state between two or more multi-homed provider edge (PE) routers in an Ethernet Virtual Private Network (EVPN). In the EVPN, a customer edge (CE) router is multi-homed to the two or more PE routers via an Ethernet Segment (ES) that appears as a link aggregation group (LAG) to the CE router. A first one of the PE routers receives a join request for a multicast group from the CE router, and sends a join synch route to the other PE routers on the ES to synchronize multicast state for the multicast group. According to the disclosed techniques, when a second one of the PE routers receives a withdrawal of the join sync route, the second one of the PE routers detects an underlying reason for the withdrawal, and, based on the detected reason, determines whether to retain or delete the multicast state for the multicast group at the PE router.

The withdrawal of the join synch route may be categorized as either a timeout event or a disruption event. A timeout event indicates that a host or receiver connected to the CE router no longer desires traffic of the multicast group. In contrast, a disruption event indicates that a failure has occurred with respect to the first one of the PE routers, but that the host or receiver is still interested in receiving traffic of the multicast group. According to the techniques of this disclosure, if a disruption event occurs such that the first one of the PE routers is unable to reach the host, the second one of the PE routers retains the multicast state for the multicast group. In this way, the techniques of this disclosure avoid traffic black holing in which the PE routers stop forwarding traffic to the host or receiver even though the host desires to receive the traffic.

In one example, this disclosure describes a method including: receiving, by a first provider edge (PE) router of a plurality of PE routers included in an Ethernet segment of an Ethernet Virtual Private Network (EVPN) and from a second PE router of the plurality of PE routers, a withdrawal of a Border Gateway Protocol (BGP) join synch route used to synchronize a join request for a multicast group across the Ethernet segment, wherein a customer edge (CE) router is multi-homed to the plurality of the PE routers over the Ethernet segment; in response to receiving the withdrawal of the BGP join synch route, determining, by the first PE router, whether the withdrawal of the BGP join synch route is due to a multicast state timeout event at the second PE router or a disruption event at the second PE router; upon determining that the withdrawal of the BGP join synch route is due to the disruption event at the second PE router, retaining, by the first PE router, a multicast state for the multicast group associated with the BGP join synch route, and forwarding, by the first PE router, multicast traffic of the multicast group toward at least one receiver connected to the CE router; and upon determining that the withdrawal of the BGP join synch route is due to the multicast state timeout event at the second PE router, deleting, by the first PE router, the multicast state for the multicast group associated with the BGP join synch route, and stopping, by the first PE router, forwarding of the multicast traffic of the multicast group.

In another example, this disclosure describes a first provider edge (PE) router of a plurality of PE routers included in an Ethernet segment of an Ethernet Virtual Private Network (EVPN), configured to: receive, from a second PE router of the plurality of PE routers, a withdrawal of a Border Gateway Protocol (BGP) join synch route used to synchronize a join request for a multicast group across the Ethernet segment, wherein a customer edge (CE) router is multi-homed to the plurality of the PE routers over the Ethernet segment; and in response to receiving the withdrawal of the BGP join synch route, determine whether the withdrawal of the BGP join synch route is due to a multicast state timeout event at the second PE router or a disruption event at the second PE router; upon determining that the withdrawal of the BGP join synch route is due to the disruption event at the second PE router, retain a multicast state for the multicast group associated with the BGP join synch route, and forward multicast traffic of the multicast group toward at least one receiver connected to the CE router; and upon determining that the withdrawal of BGP join synch route is due to the multicast state timeout event at the second PE router, delete the multicast state for the multicast group associated with the BGP join synch route and stop forwarding of the multicast traffic of the multicast group.

In another example, this disclosure describes a non-transitory computer readable medium including instructions that, when executed, are configured to cause a first provider edge (PE) router of a plurality of PE routers included in an Ethernet segment of an Ethernet Virtual Private Network (EVPN), to: receive, from a second PE router of the plurality of PE routers, a withdrawal of a Border Gateway Protocol (BGP) join synch route used to synchronize a join request for a multicast group across the Ethernet segment, wherein a customer edge (CE) router is multi-homed to the plurality of the PE routers over the Ethernet segment; and in response to receiving the withdrawal of the BGP join synch route, determine whether the withdrawal of the BGP join synch route is due to a multicast state timeout event at the second PE router or a disruption event at the second PE router; upon determining that the withdrawal of the BGP join synch route is due to the disruption event at the second PE router, retain a multicast state for the multicast group associated with the BGP join synch route, and forward multicast traffic of the multicast group toward at least one receiver connected to the CE router; and upon determining that the withdrawal of BGP join synch route is due to the multicast state timeout event at the second PE router, delete the multicast state for the multicast group associated with the BGP join synch route and stop forwarding of the multicast traffic of the multicast group.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Techniques are described for synchronizing multicast state between two or more multi-homed PE routers in an EVPN. In an EVPN, a CE router is multi-homed to two or more PE routers via an ES that appears as a LAG to the CE router. A first one of the PE routers receives a join request for a multicast group from the CE router. In response, the first one of the PE routers sends a BGP join synch route to other PE routers on the ES to synchronize multicast state for the multicast group, and the other PE routers install the BGP join synch route.

According to the disclosed techniques, when a second one of the PE routers receives a withdrawal of the BGP join synch route from the first one of the PE routers, the second one of the PE routers determines whether the withdrawal is caused by a timeout event or a disruption event, Based on the determined reason for the withdrawal, the second one of the PE routers determines whether to retain or delete the multicast state for the multicast group at the PE router. As contemplated herein, the withdrawal of the join synch route may be categorized as either a timeout event or a disruption event. A timeout event indicates that a host or receiver connected to the CE router no longer desires traffic of the multicast group, and so the PE routers should stop forwarding traffic for the multicast group to the host or receiver. In contrast, a disruption event indicates that a failure has occurred within the EVPN such that the first one of the PE routers is no longer able to reach the host, but that the host or receiver is still interested in receiving traffic of the multicast group. For example, a disruption event occurs if one or more links in the ES are disrupted such that a PE router that originated the multicast join synch route is unable to reach the host, or if the originating PE router goes offline.

For example, if the second one of the PE routers determines that the withdrawal of the BGP join synch route is due to a disruption event, the second one of the PE routers retains the IGMP multicast state for the multicast group and continues to forward traffic for the multicast group to the host or receiver. In another example, if the second one of the PE routers determines that the withdrawal of the BGP join synch route is due to a timeout event, the second one of the PE routers deletes the IGMP multicast state for the multicast group and stops forwarding traffic for the multicast group to the host or receiver. Alternatively, or in addition, the PE router determines whether it possesses a self-originated BGP join synch route for the multicast group or a BGP join synch route for the multicast group that was originated by a PE router other than the PE router originating the withdrawal (e.g., whether alternate originators of the BGP join synch route exist, and thus alternate routes to the host or receiver exist). If so, then the PE router retains the IGMP state for the multicast group and continues to forward multicast traffic to the host or receiver.

In contrast, in other EVPN systems that do not use the techniques of the disclosure, if a disruption in the network occurs, a withdrawal of the BGP join synch route is issued to other PE routers in the ES to notify other PE routers that the route is no longer valid for multicast traffic. In response to receiving the withdrawal of the BGP join synch route, the other PE routers delete both the BGP join synch route and IGMP state for the multicast group. Thus, even though the host may still be interested in receiving traffic for the multicast group, and even though alternate routes to the host may still exist, the other PE routers in the ES stop forwarding multicast traffic to the host and instead discard the traffic, causing traffic black holing until the host transmits a subsequent IGMP report. This problem exists because in other EVPN systems, the PE routers are unable to determine the root cause of a withdrawal of a BGP join synch route (e.g., whether the withdrawal is due to a timeout event because the host or receiver no longer desiring the multicast traffic, or because of a disruption event due to a fault in the network). Thus, by using the techniques of this disclosure, PE routers within an EVPN may determine the cause of a withdrawal of a BGP join synch route and retain or delete multicast state based on the cause of the withdrawal. Such techniques may avoid traffic black holing in situations where the host or receiver desires to receive traffic for a multicast group, but a disruption in the EVPN causes a withdrawal of a BGP join synch route for the multicast group.

Figure 1:
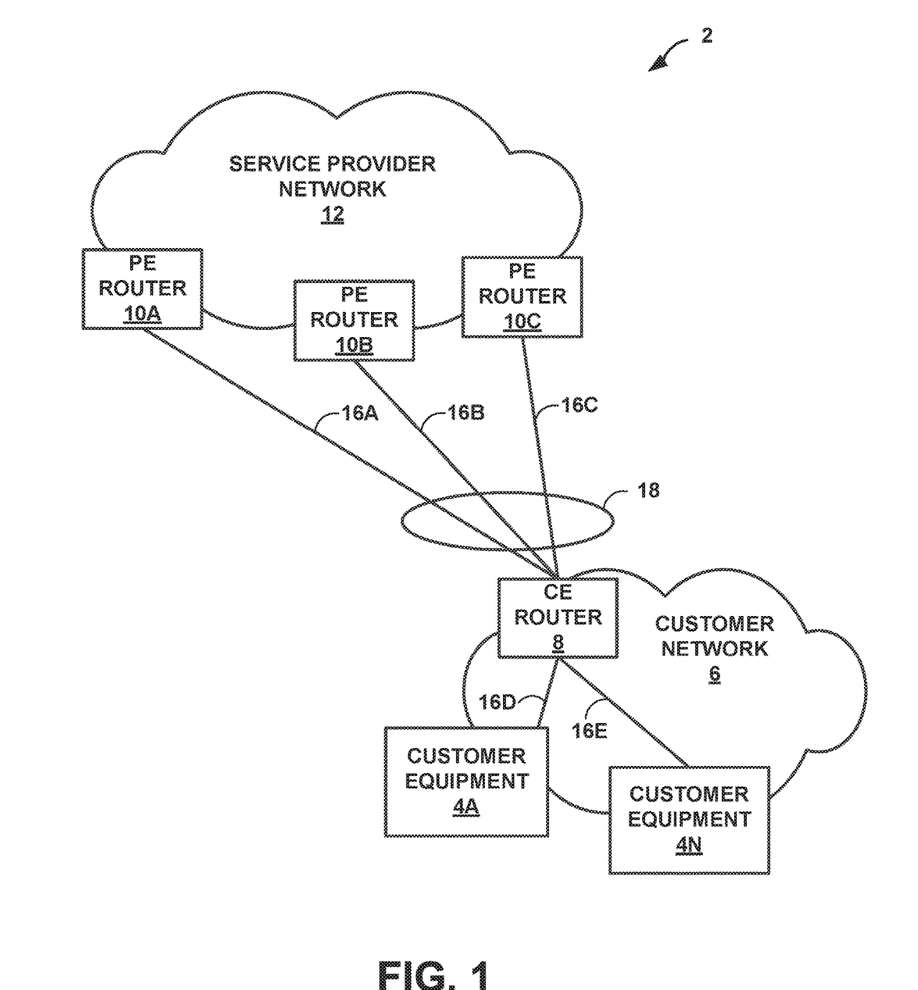
FIG. 1 is a block diagram illustrating an example Ethernet Virtual Private Network (EVPN) within a network system, in accordance with the techniques of the disclosure.

FIG. 1 is a block diagram illustrating an example Ethernet Virtual Private Network (EVPN) within a network system 2, in accordance with the techniques of the disclosure. In the example of FIG. 1, network system 2 includes a customer network 6 and a service provider network 12 configured to host an EVPN core to connect customer network 6 to other remote customer networks or other network resources (not shown in FIG. 1). PE routers 10A-10C ("PE routers 10") of service provider network 12 provide customer equipment 4A-4N ("customer equipment 4") associated with customer network 6 with access to service provider network 12 via CE router 8. Communication links 16A-16E ("communication links 16") may be Ethernet, ATM, or any other suitable network connections. The configuration of network system 2 illustrated in FIG. 1 is merely an example. For example, an enterprise network system may include more than one customer network. Nonetheless, for ease of description, only a single customer network 6 is illustrated in FIG. 1.

PE routers 10 and CE router 8 are illustrated as routers in the example of FIG. 1. However, techniques of the disclosure may be implemented using switches or other suitable network devices that participate in a layer two (L2) virtual private network service, such as an EVPN. Customer network 6 may be a network for geographically separated sites of an enterprise. Customer network 6 includes customer equipment 4, such as, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

As shown in FIG. 1, CE router 8 may be multi- and/or singly-homed to one or more of PE routers 10. In EVPN, a CE router may be said to be multi-homed when it is coupled to two or more distinct PE routers within the same EVPN instance (EVI), and each of the PE routers are resident on the same physical Ethernet Segment (ES). Multi-homed networks are often employed by network operators so as to provide redundant access to the EVPN provided by service provider network 12 should a failure in one of links 16A, 16B, and 16C occur. In the example of FIG. 1, CE router 8 is multi-homed to PE routers 10A, 10B, and 10C via links 16A-16C, respectively, where each of PE routers 10A, 10B, and 10C are capable of providing access to EVPN for L2 customer network 6 via CE router 8.

Service provider network 12 represents a publicly accessible computer network that is owned and operated by a service provider, which is usually large telecommunications entity or corporation. Service provider network 12 is may be a layer three (L3) computer network, where reference to a layer followed by a number refers to a corresponding layer in the Open Systems Interconnection (OSI) model. Service provider network 12 is an L3 network in the sense that it natively supports L3 operations as described in the OSI model. Common L3 operations include those performed in accordance with L3 protocols, such as the Internet protocol (IP). L3 is also known as a "network layer" in the OSI model and the term L3 may be used interchangeably with the phrase "network layer" throughout this disclosure.

Although not illustrated, service provider network 12 may be coupled to one or more networks administered by other providers, and may thus form part of a large-scale public network infrastructure, e.g., the Internet. Consequently, customer network 6 may be viewed as an edge network of the Internet. Service provider network 12 may provide computing devices (i.e., customer equipment 4) within customer network 6 with access to the Internet, and may allow computing devices within customer network 6 and other remote customer networks to communicate with each other.

Although additional network devices are not shown for ease of explanation, it should be understood that service provider network 12 may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Further, service provider network 12 may couple to one or more computer networks not depicted in FIG. 1. Moreover, although the elements of service provider network 12 and customer network 6 are illustrated as being directly coupled, it should be understood that one or more additional network elements may be included along any of communication links 16, such that the network elements of service provider network 12 and customer network 6 are not directly coupled.

Service provider network 12 typically provides a number of residential and business services, including residential and business class data services (which are often referred to as "Internet services" in that these data services permit access to the collection of publicly accessible networks referred to as the Internet), residential and business class telephone and/or voice services, and residential and business class television services. One such business class data service offered by service provider network 12 includes EVPN service. For example, an EVPN is a service that provides a form of L2 connectivity across an intermediate L3 network, such as service provider network 12, to interconnect two L2 customer networks, such as customer network 6 and another remote customer network, that are usually located in two different geographic areas. Often, an EVPN is transparent to the customer networks in that these customer networks are not aware of the intervening intermediate service provider network and instead act and operate as if these two customer networks were directly connected and formed a single L2 network. In this way, an EVPN enables a form of a transparent LAN connection between two geographically distant customer sites that each operates a L2 network and, for this reason, EVPN may also be referred to as a "transparent LAN service."

An EVPN may operate over a Multi-Protocol Label Switching (MPLS) configured network and use MPLS labels to forward network traffic accordingly. MPLS is a mechanism used to engineer traffic patterns within Internet Protocol (IP) networks according to the routing information maintained by the routers in the networks. By utilizing MPLS protocols, such as the Label Distribution protocol (LDP) or the Resource Reservation Protocol with Traffic Engineering extensions (RSVP-TE), a source device can request a path through a network to a destination device, i.e., a Label Switched Path (LSP). An LSP defines a distinct path through the network to carry MPLS packets from the source device to a destination device. Using a MPLS protocol, each router along an LSP allocates a label and propagates the label to the closest upstream router along the path. Routers along the path add or remote the labels and perform other MPLS operations to forward the MPLS packets along the established path. Additional information with respect to the EVPN protocol is described in "BGP MPLS-Based Ethernet VPN," RFC 7432, Internet Engineering Task Force (IETF), February 2015, available at https://tools.ietf.org/html/rfc7432, the entire contents of which is incorporated herein by reference.

To configure an EVPN, a network operator of the service provider configures various devices included within service provider network 12 that interface with customer network 6. The EVPN configuration may include an EVI, which comprises one or more broadcast domains. Generally, an EVI may refer to a routing and forwarding instance on a PE router, such as PE routers 10A-10C. Consequently, multiple EVIs may be configured on PE routers 10 for an Ethernet segment (ES), as further described herein, each providing a separate, logical L2 forwarding domain. In this way, multiple EVIs may be configured that each includes one or more of PE routers of an Ethernet segment. For example, Ethernet segment 18 may comprise a first EVI which includes PE routers 10A, 10B, and 10C, and a second EVI, which includes only PE routers 10A and 10B. In some examples, Ethernet Tags are then used to identify a particular broadcast domain, e.g., a VLAN, in an EVI. A PE router may advertise a unique EVPN label per <ESI, Ethernet Tag> combination. This label assignment methodology is referred to as a per-<ESI, Ethernet Tag> label assignment. Alternatively, a PE router may advertise a unique EVPN label per media access control (MAC) address. In still another example, a PE router may advertise the same single EVPN label for all MAC addresses in a given EVI. This label assignment methodology is referred to as a per EVI label assignment.

In one example, to operate Ethernet segment 18 in an active-active Ethernet segment, PE routers 10A, 10B, and 10C perform an EVPN designated forwarder (DF) election for Ethernet segment 18. This may be accomplished, for example, by each of PE routers 10A, 10B, and 10C that participates in Ethernet segment 18 outputting a routing protocol message advertising an Ethernet Segment Identifier (ESI), which is typically unique across all EVPN instances (EVIs).

FIG. 1 illustrates an EVPN environment that includes Ethernet segment 18. In typical operation, PE routers 10A-10C communicate using the Border Gateway Protocol (BGP). PE routers 10 may interoperate using BGP in accordance with the techniques described in "BGP MPLS-Based Ethernet VPN," RFC7432, as referenced above.

In the example of FIG. 1, when providing EVPN service to customer network 6, PE routers 10 and CE router 8 typically perform MAC address learning to efficiently forward L2 network communications in service provider network 12. That is, as PE routers 10 and CE router 8 forward Ethernet frames, the routers learn L2 state information for the L2 network, including MAC addressing information for customer equipment 4 within the network and the physical ports through which customer equipment 4 are reachable. PE routers 10 and CE router 8 typically store the MAC addressing information in MAC tables associated with respective interfaces. When forwarding an individual Ethernet frame received on one interface, a router typically broadcasts the Ethernet frame to all other interfaces associated with the EVPN unless the router has previously learned the specific interface through which the destination MAC address specified in the Ethernet frame is reachable. In this case, the router forwards a single copy of the Ethernet frame out the associated interface.

Moreover, as PE routers 10 learn the MAC address for customer equipment 4 reachable through local attachment circuits, the PE routers 10 utilize MAC address route advertisements of a L3 routing protocol (i.e., BGP in this example) to share the learned MAC addresses and to provide an indication that the MAC addresses are reachable through the particular PE router that is issuing the route advertisement. In the EVPN implemented using PE routers 10 for a given EVI, each of PE routers 10 advertises the locally learned MAC addresses to other PE routers 10 using a BGP route advertisement, also referred to herein as a "MAC route" or a "MAC Advertisement route." As further described below, a MAC route typically specifies an individual MAC address of customer equipment 4 along with additional forwarding information, such as a route descriptor, route target, layer 2 segment identifier, MPLS label, etc. In this way, PE routers 10 use BGP to advertise and share the MAC addresses learned when forwarding layer two communications associated with the EVPN. Accordingly, PE routers 10 may perform both local learning and remote learning of MAC addresses.

Network traffic from the EVPN core may be associated with a (Source, Group), i.e., (S, G), label to designate a source of the traffic and a multicast group to which the traffic belongs. PE routers 10 of Ethernet segment 18 may use Internet Group Management Protocol (IGMP) Join and Leave messages received from the CE network device 8 to establish multicast group state for routing purposes. For example, PE routers 10 of the ES 18 may use the IGMP protocol to receive multicast group membership information from hosts or receivers, e.g., customer equipment 10, connected to CE router 8. Upon receiving, from the hosts, a notification to subscribe in the membership of a particular multicast group, one of PE routers 10 forwards this request to the other PE routers 10 of ES 18 over the EVPN using Ethernet Multicast Source Group Route NLRI (Network Layer Reachability Information). The NLRI also tracks the IGMP protocol version of a recipient as well as any source filtering for a given group membership. Thus, the PE routers 10 of the Ethernet segment 18 may route multicast network traffic of the requested multicast group to the CE device 8 based on the (S, G) label of the multicast traffic.

Additional detail of IGMP is provided within "Host Extensions for IP Multicasting", RFC 1112, Internet Engineering Task Force (IETF), August 1989, available at https://tools.ietforg/html/rfc1112; "Internet Group Messaging Protocol, Version 2," RFC2236, Internet Engineering Task Force (IETF), November, 1997, available at https://tools.ietforg/html/rfc2236; "Internet Group Management Protocol, Version 3," RFC3376, Internet Engineering Task Force (IETF), October 2002, available at https://tools.ietf.org/html/rfc3376; and "Using Internet Group Management Protocol Version 3 (IGMPv3) and Multicast Listener Discovery Protocol Version 2 (MLDv2) for Source-Specific Multicast," RFC4604, Internet Engineering Task Force (IETF), August 2006, available at https://tools.ietf.org/html/rfc4604; the entire contents of each of which is incorporated herein by reference.

In the example of FIG. 1, ES 18 is configured to operate in all-active redundancy mode. In all-active redundancy mode, each of PE routers 10 attached to ES 18 is configured to forward known unicast traffic to and from customer network 6. While operating in this mode, any of PE routers 10 may receive traffic from customer network 6 and CE router 8 may send a given IGMP message to any one of the multi-homed PE routers 10, including the DF or a PE router that is a non-DF. Therefore, each of the PE routers 10 attached to ES 18 synchronizes IGMP Join and Leave Group state with the other PE routers 10 across ES 18. The IGMP Join and Leave Group state may be represented as (x, G), where x may be either any source * or a particular source S for each EVI on ES 18, and G is a multicast group. By synchronizing IGMP Join and Leave Group state, the DF for a particular Ethernet Segment (ES), EVPN Instance (EVI), and Bridge Domain (BD) (hereinafter, "[ES, EVI, DB]") may correctly advertise or withdraw routes to the EVPN core for the multicast traffic for that multicast group. The DF router 10A, for example, may advertise such a route (e.g., a BGP join synch route) for the multicast group to each of PE routers 10 belonging to ES 18.

PE routers 10 within an EVPN may communicate such IGMP instructions by exchanging routing and forwarding information according to route types set forth by BGP. Additional detail of BGP is provided by RFC 7432, as referenced above. The standard set forth in RFC 7432 sets forth the following types of BGP routes.

Type-0. A Type-0 route indicates an arbitrary 9-octet Ethernet Segment Identifier (ESI) value, which is managed and configured by the operator.

Type-1. When IEEE 802.1AX Link Aggregation Control Protocol (LACP) is used between the PEs and CEs, a Type-1 route indicates an auto-generated ESI value determined from LACP that includes the CE LACP System MAC address and the CE LACP Port Key. The CE router treats the multiple PE routers to which the CE router is multi-homed as the same switch. Thus, the Type-1 route allows the CE to aggregate links that are attached to different PEs in the same bundle.

Type-2. A Type-2 route is used in the case of indirectly connected hosts via a bridged LAN between the CEs and the PEs. The ESI Value is auto-generated and determined based on the Layer 2 bridge protocol. If the Multiple Spanning Tree Protocol (MSTP) is used in the bridged LAN, then the value of the ESI is derived by listening to Bridge PDUs (BPDUs) on the Ethernet segment. To achieve this, the PE router is not required to run MSTP. However, the PE must learn the Root Bridge MAC address and Bridge Priority of the root of the Internal Spanning Tree (IST) by listening to the BPDUs. The Type-2 route includes a Root Bridge MAC address and a Root Bridge Priority.

Type-3. A Type-3 route indicates a MAC-based ESI Value that can be auto-generated or configured by the operator. The ESI Value includes a System MAC address and a Local Discriminator value.

Type-4. A Type-4 route indicates a router-ID ESI Value that can be auto-generated or configured by the operator. The ESI Value includes a Router ID and a Local Discriminator value.

Type-5. A Type-5 route indicates an Autonomous System (AS)-based ESI Value that can be auto-generated or configured by the operator. The ESI Value includes an AS number owned by the system and a Local Discriminator value.

Additionally, several additional BGP routes are discussed herein:

Type-6. A Type-6 route indicates that a PE router supports a particular extended community. A PE router may issue a Type-6 route to advertise that the PE router supports the particular extended community. In some examples, the Type-6 route includes a Subtype that identifies the particular extended community that is supported, such as IGMP proxy or Selective Multicast. Each Subtype may be a unique identifier that the Internet Assigned Numbers Authority (IANA) assigns from the EVPN Extended Community Subtypes registry. The Type-6 route may be encoded as an 8-octet value, wherein a first field defines the BGP route type as a Type-6 BGP route and a second field defines a subtype of the Type-6 route. The remaining bits are reserved.

For example, a PE router may implement the IGMP proxy extended community. When advertising an ES route for a particular ES, a PE router that supports IGMP proxy on the ES attaches the Type-6 route to the ES route to advertise its support for the IGMP proxy extended community. Because all PE routers attached to a given ES must coordinate IGMP Join (x, G) state, all PE routers attached to a given ES must support IGMP proxy before the ES may activate IGMP proxy. An RFC 7432 compliant PE router does not advertise a Type-6 route. Thus, the absence of a Type-6 route in an ES route advertisement indicates that the advertising PE router does not support IGMP proxy.

As another example, a PE router may implement the Selective Multicast extended community. A PE router that supports Selective Multicast on a given EVI must attach this extended community to an Inclusive Multicast Ethernet Tag route that the PE router advertises for that EVI. An RFC 7432 compliant PE router does not advertise a Type-6 route. Thus, the absence of a Type-6 route in an ES route advertisement indicates that the advertising PE router does not support Selective Multicast.

Type-7. A Type-7 BGP route, also referred to herein as a BGP join synch route, is used for coordinating or synchronizing a multicast join synch request amongst PE routers of an ES. In other words, an EVPN may use a Type-7 route to coordinate the IGMP Join (x,G) state for a given EVI between each of the PE routers attached to a given ES when operating in either single- or all-active redundancy mode. The Type-7 route indicates that a PE router has received an IGMP join request to join a multicast group on the ES. When one of the PE routers receives an IGMP join report on the Ethernet segment (ES) from the CE router, it sends out a BGP Type-7 route with the ESI value. Each additional multi-homed PE router on the Ethernet Segment imports the Type-7 route and, based on the Type-7 route, syncs its IGMP state. The PE router that is the designated forwarder (DF) forwards multicast traffic from the EVPN core to the at least one receiver connected to the CE router, while other PE routers that are not the DF drop the traffic. Because the states of the PE routers are synchronized via the Type-7 route, if the DF goes offline, another PE router may immediately take over as the DF and continue forwarding traffic to the CE device.

In the example of FIG. 1, PE routers 10A, 10B, and 10C belong to ES 18, and have elected PE router 10B as the DF. If PE router 10A, for example, receives an IGMP join report on the ES from CE router 8, it sends out a BGP Type-7 route with the Ethernet Segment Identifier (ESI) value. Each additional multi-homed PE router on the Ethernet Segment, e.g., PE routers 10B and 10C, imports the Type-7 route and, based on the Type-7 route, creates an IGMP state. PE router 10B, as the designated forwarder (DF), forwards traffic from the EVPN core to the at least one receiver via CE router 8, while other PE routers that are not the DF, e.g., PE routers 10A and 10C, drop the traffic. Because the states of the PE routers are synchronized via the Type-7 route, if the DF goes offline, another PE router, such as PE router 10A or 10C, may immediately take over as the DF and continue forwarding traffic to the at least one receiver via CE router 8.

Typically, if the host or receiver (e.g., customer equipment 4) no longer desires to receive traffic for a particular multicast group, CE router 8 transmits a multicast group leave request to PE router 10. Alternatively, the host or receiver does not refresh a join request for the multicast group but instead allows its participation in the multicast group to timeout. In response to receiving a multicast group leave request from CE router 8 or detecting that participation by the host or receiver in the multicast group has timed out, one of PE routers 10 issues a withdrawal of a multicast join synch route to other PE routers 10 within ES 18. In some examples, the withdrawal of a multicast join synch route is a withdrawal of a BGP Type-7 join synch route. Upon receiving such a withdrawal of BGP join synch route, other PE routers 10 in the ES 18 delete IGMP state for the multicast group. In this way, the PE routers 10 cease forwarding traffic for the multicast group to the at least one receiver connected to CE router 8.

In other EVPN systems, if a disruption in the network occurs, such as if one or more links in the ES are disrupted such that a PE router that originated the multicast join synch route is unable to reach the host, or if the originating PE router goes offline, the host is still interested in receiving traffic for the multicast group. However, the originating PE router deletes IGMP state for the multicast group and, as the originator of the BGP join synch route, issues a withdrawal of the BGP join synch route to other PE routers within the ES. Further, the PE routers that receive a withdrawal of the BGP join synch route delete IGMP state for the multicast group without regard to the cause of the withdrawal. Such a scenario causes traffic black holing, i.e., the PE routers stop forwarding traffic to the host and instead discard the traffic, even though the host desires to receive the traffic. Typically, because the host transmits an IGMP report renewing its subscription to the multicast group every two minutes, such traffic black holing may continue until the host transmits a subsequent IGMP report.

Withdrawal of the BGP join synch route may be categorized in two ways: timeout events and disruption events. Timeout events indicate that the host no longer desires traffic from the multicast group. In contrast, disruption events indicate that a fault in the EVPN has obstructed the route to the host or receiver specified by a BGP join synch route, but the host is still interested in receiving traffic for the multicast group.

Timeout events include events such as the failure of a host to refresh an IGMP report until hold time (e.g., a Default Join Timeout), and the receipt of an IGMP multicast group leave request from a host which results in the running of a Last Member Query (LMQ) timer (e.g., an LMQ Join Timeout). Typically, the host or receiver must refresh an IGMP report (e.g., a list of multicast groups to which the host desires to subscribe) every 120 seconds. If the host fails to do so, a Default Join Timeout occurs. Instead of allowing membership to a multicast group to expire, a host may alternatively transmit an IGMP Leave Request to the PE router. Upon receiving such an IGMP Leave Request, the PE router informs other PE routers on the ES of the Leave Request and activates an LMQ timer (typically, 1000 milliseconds) for each PE router on the ES to cease the transmission to the host of traffic for the multicast group. If this time expires without receiving a request from the host to resume membership in the multicast group, an LMQ Join Timeout occurs. If either a Default Join Timeout or an LMQ Join Timeout occurs, the PE router may consider such an event to indicate that the host no longer desires to receive traffic for the corresponding multicast group and issues a withdrawal of a BGP join synch route for the multicast group to other PE routers in the ES.

In contrast, disruption events include such events such as a failure in a link in the ES to the host or receiver, or alternatively, a failure in the PE router that originated the BGP join synch route. For example, if a link in the ES between the originating PE router and the host or receiver goes offline, an ESI Link Down event occurs. Such an ESI Link Down event may occur if devices establishing the link or ESI fail, or if the link is manually disabled. Similarly, if the PE router that originated the BGP join synch route suffers failure, a Peer Down event occurs. A Peer Down event may occur, for example, if the originating PE router crashes, reboots, restarts, suffers BGP session flapping (e.g., frequently alternating between connected to and disconnecting from the EVPN), suffers core isolation, suffers power failure, undergoes maintenance, etc. Disruption events indicate that a problem exists with the originating PE router, but the host is still interested in traffic for the multicast group.

According to the techniques of the disclosure, upon receiving a withdrawal of a BGP join synch route, the receiving PE router 10B determines whether the receiving PE router 10B possesses a self-originated BGP join synch route for the multicast group or a BGP join synch route for the multicast group that was originated by a PE router other than the PE router 10A issuing the withdrawal. In other words, the receiving PE router 10B determines whether some other originator for the BGP join synch route for the multicast group exists beyond the PE router 10A that withdrew the multicast join synch route. If so, then the receiving PE router 10B retains the IGMP state because other PE routers possess a local IGMP state for the multicast group (e.g., alternate originators of the multicast join synch route exist).

If the receiving PE router 10B determines that it does not possess such an alternate BGP join synch route, then the receiving PE router 10B determines whether the withdrawal of the BGP join synch route is due to either a timeout event or a disruption event. Upon determining that the withdrawal is due to a disruption event, the PE router 10B retains IGMP state and continues to forward traffic for the multicast group to the host connected to CE router 8 for a predetermined amount of time, or alternatively, until a subsequent IGMP refresh is received from CE router 8, so as to avoid traffic black holing. Upon determining that the withdrawal is due to a timeout event, the PE router 10B deletes IGMP state and stops forwarding traffic for the multicast group to the at least one receiver connected to CE router 8 so as to avoid leave/timeout latencies.

With respect to FIG. 1, PE router 10A originates a BGP join synch route to PE routers 10B and 10C. PE routers 10B and 10C install the BGP join synch route. In the situation where link 16A between PE router 10A and CE router 8 goes offline, PE router 10A removes all IGMP states associated with the offline link 16A. Thus, PE router 10A deletes an IGMP state for the multicast group and, because PE router 10A originated the BGP join synch route for the multicast group, PE router 10A issues a withdrawal of the BGP join synch route to PE routers 10B and 10C. PE routers 10B and 10C determine the cause of the withdrawal of the BGP join synch route to be due to an ESI link down event. Accordingly, PE routers 10B and 10C retain their IGMP states and continue to forward traffic for the multicast group to the at least one receiver connected to CE router 8. Thus, no black holing of traffic for the multicast group occurs. In some examples, routers 10B and 10C retain their IGMP states for up to two minutes or until the PE routers 10 receive an IGMP refresh report from CE router 8.

In the above example, PE routers 10B and 10C may determine the cause of a withdrawal of a BGP join synch route in the following fashion. Upon receiving a withdrawal of a BGP join synch route for a multicast group from PE router 10A, PE router 10B determines whether PE router 10A is online by determining whether an entry for PE router 10A exists in an EVPN Routing Information Base (RIB) of PE router 10B. If the entry for PE router 10A exists in the RIB of PE router 10B, then PE router 10B determines whether a BGP Type-1 route from PE router 10A exists for ES 18. Upon detecting that an ES link 16, such as link 16A, is down, PE router 10A may issue a withdrawal of a BGP Type-1 route for ES 18 prior to issuing a withdrawal of the BGP join synch route. Thus, determining whether a BGP Type-1 route from PE router 10A exists may allow for earlier detection of a disruption event such as a Peer Down or ESI Link Down event.

If both the entry for PE router 10A and the BGP Type-1 route from PE router 10A exist, then PE router 10B determines that the withdrawal of the BGP join synch route is due to a timeout event, such as a Default Join Timeout or a LMQ timeout. Upon determining that the withdrawal is due to a timeout event, PE router 10B deletes IGMP state and stops forwarding traffic for the multicast group to the host or receiver so as to avoid leave/timeout latencies. Further, upon deleting the IGMP state, PE router 10B also deletes the BGP join synch route for the multicast group.

If one or both of the entry for PE router 10A and the BGP Type-1 route from PE router 10A do not exist, then PE router 10B determines that the withdrawal of a BGP join synch route is due to a disruption event, such as a Peer Down or ESI Down event. Upon determining that the withdrawal is due to a disruption event, PE router 10B retains IGMP state and continues to forward traffic for the multicast group to the host connected to CE router 8 so as to avoid traffic black holing. While PE router 10B retains IGMP state, PE router 10B deletes the BGP join synch route for the multicast group.

Accordingly, PE routers 10 of the present disclosure may receive a withdrawal of a BGP join synch route and detect the underlying reason for the withdrawal of the BGP join synch route. Such PE routers 10 may avoid black holing of multicast traffic when a disruption event on the ES occurs, while still allowing a host to gracefully withdraw from a multicast group without suffering withdrawal latency.

Figure 2:
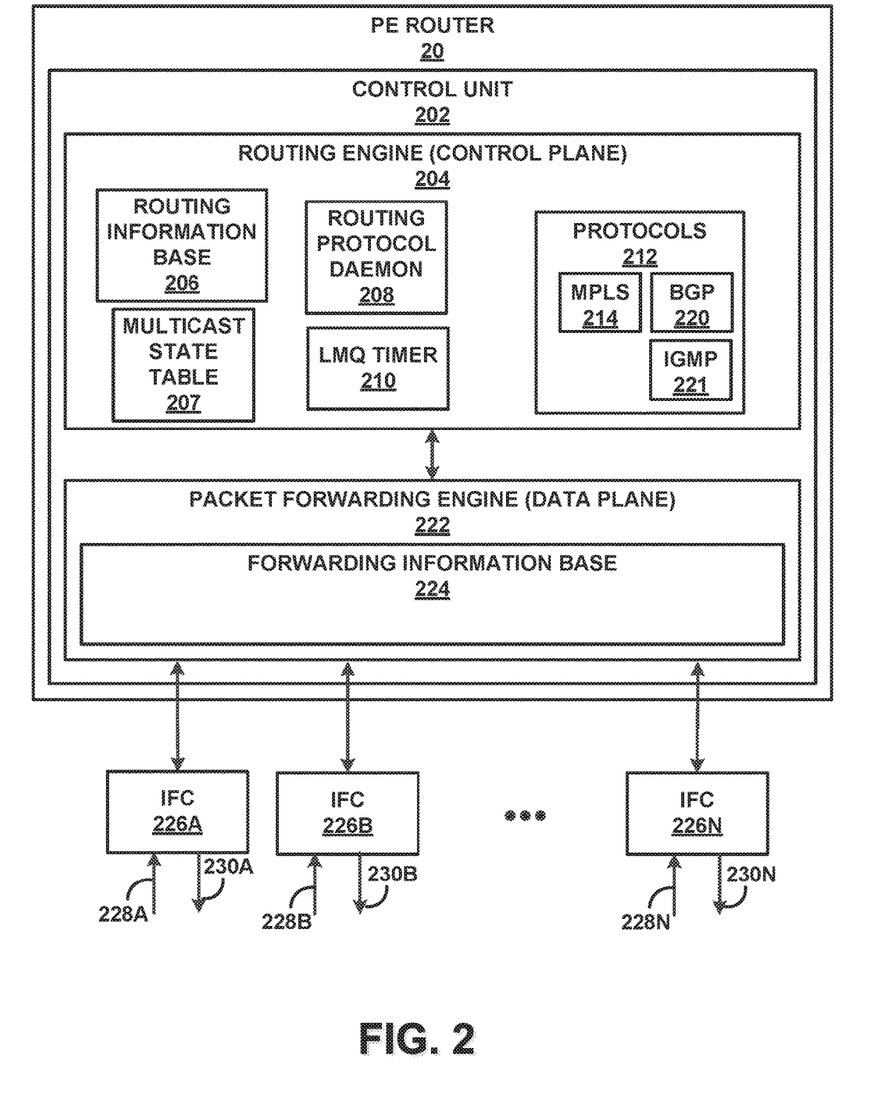
FIG. 2 is a block diagram illustrating an example provider edge router within an EVPN in accordance with the techniques of the disclosure.

FIG. 2 is a block diagram illustrating an example PE router 20 within an EVPN in accordance with the techniques of the disclosure. In general, PE router 20 may operate substantially similar to PEs 10 of FIG. 1. In this example, PE router 20 includes interface cards 226A-226N ("IFCs 226") that receive packets via incoming links 228A-228N ("incoming links 228") and send packets via outbound links 230A-230N ("outbound links 230"). IFCs 226 are typically coupled to links 228, 230 via a number of interface ports. PE router 20 also includes a control unit 202 that determines routes of received packets and forwards the packets accordingly via IFCs 226.

Control unit 202 includes a routing engine 204 and a packet forwarding engine 222. Routing engine 204 operates as the control plane for router 200 and includes an operating system that provides a multi-tasking operating environment for execution of a number of concurrent processes. Routing engine 204, for example, executes software instructions to implement one or more control plane networking protocols 212. For example, protocols 212 may include one or more routing protocols, such as BGP 220, for exchanging routing information with other routing devices and for updating routing information base (RIB) 206, Multiprotocol Label Switching (MPLS) protocol 214, and Internet Group Management Protocol (IGMP) 221. A routing protocol daemon (RPD) 208 executes protocols 212. Routing engine 204 further includes a multicast state table 207. Multicast state table 207 maintains IGMP state data for a plurality of multicast groups to which PE router 20 belongs.

In addition, routing engine 204 communicates with other routers to establish and maintain an EVPN, such as the EVPN of FIG. 1, for transporting L2 communications through an intermediate L3 network so as to logically extend an Ethernet network through the intermediate L3 network. When implementing an EVPN, L2 MAC learning may be performed in the control plane 202 by exchanging, with remote PE devices, BGP messages containing MAC addresses. For example, routing engine 204 uses information recorded in RIB 206 to compose messages describing routing and reachability, which forwarding engine 222 sends to other PE routers 10 within the EVPN. In some examples, routing engine 204 composes such routing and reachability messages according to a routing protocol, such as BGP protocol 220. Additional example information with respect to EVPN and the BGP protocol is described in MPLS-Based Ethernet VPN," RFC 7432, as referenced above, the entire contents of which are incorporated herein by reference.

Forwarding information base (FIB) 224 included in packet forwarding engine (PFE) 222 may include lookup structures. Lookup structures may, given a key, such as an address, provide one or more values. In some examples, the one or more values may be one or more next hops. A next hop may be implemented as microcode, which when executed, performs one or more operations. One or more next hops may be "chained," such that a set of chained next hops perform a set of operations for respective different next hops when executed. Examples of such operations may include applying one or more services to a packet, dropping a packet, and/or forwarding a packet using an interface and/or interface identified by the one or more next hops.

RIB 206 may describe a topology of the computer network in which PE router 200 resides, and may also include routes through the shared trees in the computer network. RIB 206 describes various routes within the computer network, and the appropriate next hops for each route, i.e., the neighboring routing devices along each of the routes. Routing engine 204 analyzes information stored in RIB 206 and generates forwarding information for forwarding engine 222, stored in FIB 224. FIB 224 may associate, for example, network destinations for certain multicast groups with specific next hops and corresponding IFCs 226 and physical output ports for output links 230. FIB 224 may be a radix tree programmed into dedicated forwarding chips, a series of tables, a complex database, a link list, a radix tree, a database, a flat file, or various other data structures.

If a PE router 20, either the DF or a non-DF PE router, receives, on a given multi-homed ES operating in all-active redundancy mode, an IGMP Membership Report for (x, G), it determines the EVI to which the IGMP Membership Report belongs. If PE router 20 does not already have a local IGMP Join (x, G) state for that EVI on that ES in the RIB 206 of PE router 20, PE router 20 instantiates a local IGMP Join (x, G) state in multicast state table 207, installs a BGP Type-7 route, e.g., a BGP leave synch route, in its RIB, and advertises the BGP Type-7 route for that [ES, EVI, BD] to other PE routers on the ES. In this example, (Local IGMP Join (x, G) state refers to an IGMP Join (x, G) state that is created as the result of processing an IGMP Membership Report for (x, G).)

The BGP join synch route carries the ES-Import Route Target (RT) for the ES on which the IGMP Membership Report was received. The PE router issues the BGP join synch route to all PE routers attached to that ES. Thus, all PE routers attached to the ES receive the BGP join synch route, but PE routers not attached to the ES do not receive the BGP join synch route.

If a PE router 20, either the DF or a non-DF PE router, receives a BGP join synch route from a peer PE router on a same ES, the PE router 20 installs that route in its RIB 206. If PE router 20 does not already have an IGMP Join (x, G) state for that EVI on that ES, the PE router instantiates that IGMP Join (x,G) state in multicast state table 207. In other words, the IGMP Join (x, G) state of PE router 20 is both multicast groups for which PE router has originated BGP join synch routes, as well as multicast groups for which PE router has received (and installed) BGP join synch routes. If the DF is not currently advertising (originating) a BGP join synch route for that (x, G) group in that EVI, the DF does so now.

If PE router 20, either the DF or a non-DF PE router, deletes its local IGMP Join (x, G) state for that EVI on that ES, the PE router 20 issues to the other PE routers on the ES a withdrawal of its BGP join synch route for that multicast group.

If PE router 20, either the DF or a non-DF PE router, receives a withdrawal of a BGP join synch route from another PE router, the receiving PE router 20 removes that BGP route from RIB 206. If PE router 20 has no local IGMP Join (x, G) state and it has no installed BGP join synch routes, the PE router deletes forwarding state information, such as its IGMP Join (x, G) state, for that [EVI, BD] on that ES. If the DF no longer has an IGMP Join (x, G) state for that EVI on any ES for which it is DF, it withdraws its BGP join synch route for that (x, G) group in that EVI. In other words, the PE router advertises a BGP join synch route for an (x, G) group in an EVI only if the PE router 20 has at least one IGMP Join (x, G) state for the EVI of the ES for which it is DF. Otherwise, if PE router 20 does not have any IGMP Join (x, G) states for the EVI of any ES for which it is DF, PE router 20 withdraws the BGP join synch route.

According to the techniques of the disclosure, PE router 20 may determine the cause of a withdrawal of a BGP join synch route in the following fashion. Control unit 202 receives, via incoming links 226 of IFCs 226 and from PE router 10A of FIG. 1, a withdrawal of a BGP join synch route for a multicast group. Control unit 202 determines whether PE router 10A is online by determining whether an entry for PE router 10A exists in RIB 206. If the entry for PE router 10A exists in RIB 206, then control unit 202 determines whether a BGP Type-1 route from PE router 10A exists for ES 18 in RIB 206. For example, upon detecting that an ES link 16, such as link 16A, is down, PE router 10A may issue a withdrawal of a BGP Type-1 route for ES 18 prior to issuing a withdrawal of the BGP multicast join synch route. In other words, in the event of a disruption event, devices on the EVPN that detect the disruption event may withdraw a plurality of BGP Type-1 routes in a manner similar to MAC-Mass Withdraw, as described within U.S. patent application Ser. No. 15/083,732 to W. Lin et al., entitled "MASS MAC WITHDRAWAL FOR EVPN-DCI USING VIRTUAL ESI" and filed Mar. 26, 2016, the entire content of which is incorporated herein by reference.

Thus, determining whether a BGP Type-1 route from PE router 10A exists may allow for earlier detection of a disruption event such as a Peer Down or ESI Link Down event.

If both the entry for PE router 10A and the BGP Type-1 route from PE router 10A exist in RIB 206, then control unit 202 determines that the withdrawal of the BGP join synch route is due to a timeout event, such as a Default Join Timeout or a LMQ timeout. Upon determining that the withdrawal is due to a timeout event, control unit 202 deletes IGMP state from multicast state table 207 and stops forwarding traffic for the multicast group to the at least one receiver connected to CE router 8 so as to avoid leave/timeout latencies.

If one or both of the entry for PE router 10A and the BGP Type-1 route from PE router 10A do not exist in RIB 206, then control unit 202 determines that the withdrawal of the BGP join synch route is due to a disruption event, such as a Peer Down or ESI Down event. Upon determining that the withdrawal is due to a disruption event, control unit 202 retains IGMP state for the multicast group within multicast state table 207 and continues to forward traffic for the multicast group to CE router 8 via outgoing links 230 of IFCs 226 so as to avoid traffic black holing.

Accordingly, a PE router of the present disclosure may receive a withdrawal of a BGP join synch route and detect the underlying reason for the withdrawals of the BGP join synch route. Such a PE router may avoid black holing of multicast traffic when a disruption event on the ES occurs, while still allowing a host to gracefully withdraw from a multicast group without suffering withdrawal latency.

Figure 3:
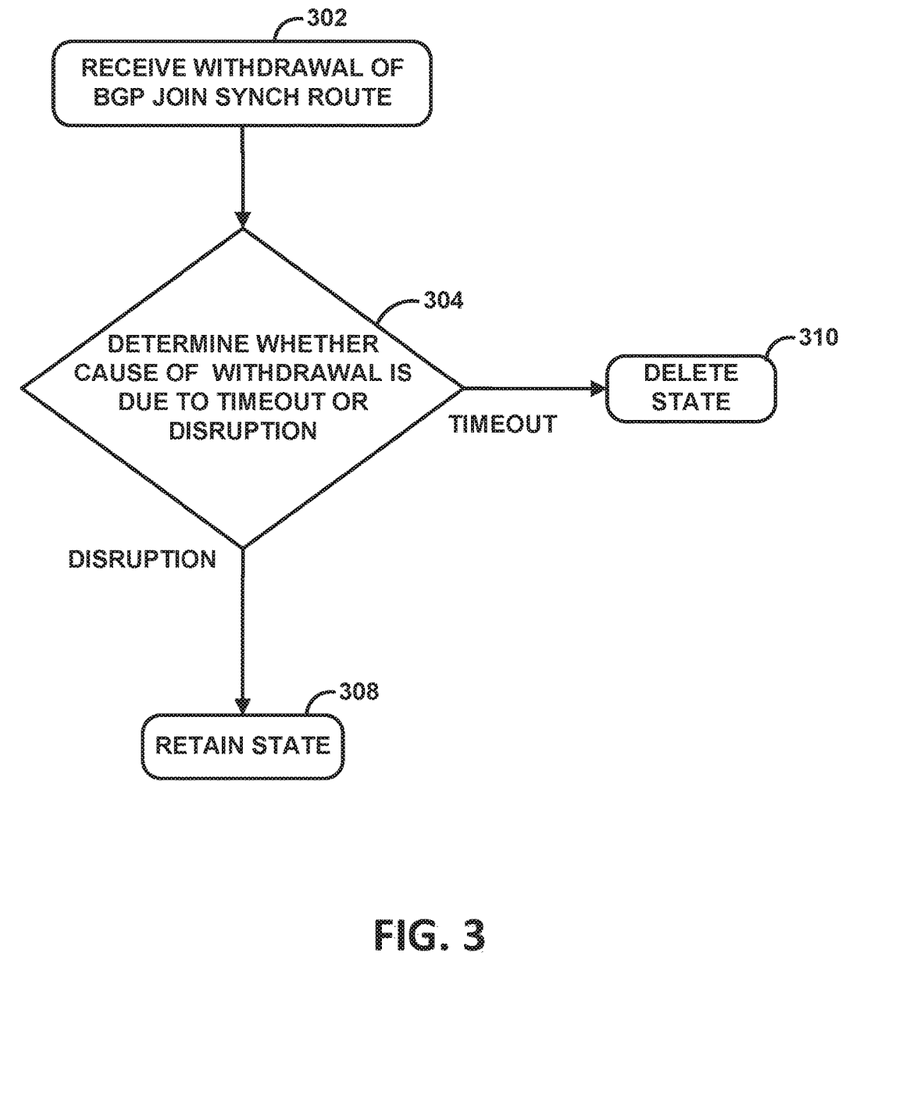
FIG. 3 is a flowchart illustrating an example operation of the provider edge router of FIG. 1 in accordance with the techniques of the disclosure.

FIG. 3 is a flowchart illustrating an example operation of the PE routers 10 of FIG. 1 in accordance with the techniques of the disclosure. The operation of PE routers 10 is described with respect to PE router 10B of FIG. 1 for convenience. With respect to FIG. 3, PE router 10A issues a withdrawal of the BGP join synch route to PE routers 10B and 10C. PE router 10B receives the withdrawal of the BGP join synch route from PE router 10A (302).

PE router 10B determines whether the cause of the withdrawal of the BGP join synch route is due to a timeout event or a disruption event (304). To determine the cause of the withdrawal, PE router 10B determines whether PE router 10A is online by determining whether an entry for PE router 10A exists in RIB of PE router 10B. If the entry for PE router 10A exists in the RIB of PE router 10B, then PE router 10B determines whether a BGP Type-1 route of PE router 10A exists for ES 18. If both the entry for PE router 10A and the BGP Type-1 route of PE router 10A exist, then PE router 10B determines that the withdrawal of the BGP join synch route is due to a timeout event, such as a Default Join Timeout or a LMQ timeout. If one or both of the entry for PE router 10A and the BGP Type-1 route from PE router 10A do not exist, then PE router 10B determines that the withdrawal of a BGP join synch route is due to a disruption event, such as a Peer Down or ESI Down event.

Upon determining that the withdrawal is due to a timeout event ("TIMEOUT" branch of 304), PE router 10B deletes IGMP state (310). PE router 10B further stops forwarding traffic for the multicast group to the at least one receiver connected to CE router 8 so as to avoid leave/timeout latencies. PE router 10B the exits the operation.

Upon determining that the withdrawal is due to a disruption event ("DISRUPTION" branch of 304), PE router 10B retains IGMP state (308). PE router further continues to forward traffic for the multicast group to the at least one receiver connected to CE router 8 so as to avoid traffic black holing. PE router 10B then exits the operation.

Figure 4:
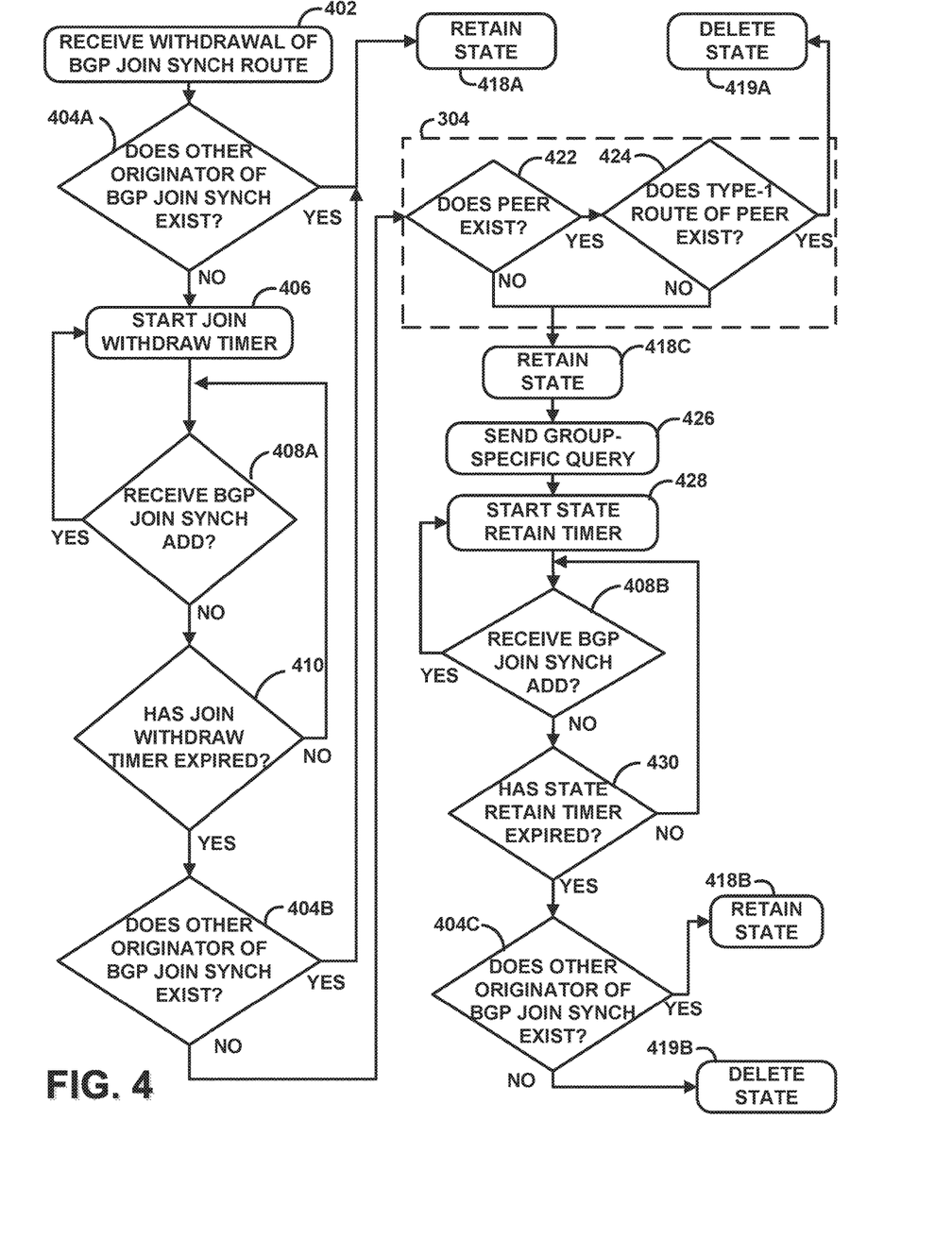
FIG. 4 is a flowchart illustrating another example operation of the provider edge router of FIG. 1 in accordance with the techniques of the disclosure.

FIG. 4 is a flowchart illustrating an example operation of a provider edge router in accordance with the techniques of the disclosure. The operation of PE routers 10 is described with respect to PE router 10B of FIG. 1 for convenience. With respect to FIG. 4, PE router 10A issues a withdrawal of the BGP join synch route to PE routers 10B and 10C. PE router 10B receives the withdrawal of the BGP join synch route from PE router 10A (402).

Upon receiving the withdrawal, PE router 10B determines whether another originator of the BGP join synch route exists (404A). If PE router 10B possesses a BGP join synch route originated by a PE router other than PE router 10A ("YES" branch of 404A), PE router 10B retains its state (418A). PE router 10B continues to forward traffic for the multicast group to the at least one receiver connected to CE router 8 and exits the operation.

If PE router 10B does not possess a BGP join synch route originated by a PE router other than PE router 10A ("NO" branch of 404A), PE router 10B starts a join withdraw timer (406). Typically, the duration of the join withdraw timer is approximately one second. If, the join withdraw timer has not expired ("NO" branch of 410), PE router 10 subsequently receives a BGP join synch route for the multicast group ("YES" branch of 408A), PE router 10 restarts the join withdraw timer. For example, in the case of an ESI Down or Peer down event, a Connectivity Fault Management (CFM) service may detect the failure and notify PE router 10B via a BGP Type-1 route. Thus, the join withdraw timer may help prevent race conditions in a situation where PE router 10B receives the withdrawal of a BGP Type-7 join synch route prior to receiving a withdrawal of a BGP Type-1 route for the ES.

Upon expiration of the join withdraw timer ("YES" branch of 410), PE router 10B determines whether it possesses a BGP join synch route originated by a PE router other than PE router 10A (404B). If PE router 10B does possess a BGP join synch route originated by a PE router other than PE router 10A ("YES" branch of 404B), PE router 10B retains its state (418A). PE router 10B continues to forward traffic for the multicast group to the at least one receiver connected to CE router 8 and exits the operation. If PE router 10B does not possess a BGP join synch route originated by a PE router other than PE router 10A ("NO" branch of 404B), PE router 10B determines whether PE router 10A is online by determining whether an entry for the originating PE router exists in an EVPN Routing Information Base (RIB) of PE router 10B (422). If the entry for PE router 10A exists in the RIB of PE router 10B ("YES" branch of 422), then PE router 10B determines whether a BGP Type-1 route for PE router 10A exists for the ES (424). If both the entry for the PE router 10A and the BGP Type-1 route from PE router 10A exist ("YES" branch of 424), then PE router 10B determines that the withdrawal of a BGP join synch route is due to a timeout event, such as a Default Join Timeout or a LMQ timeout. Upon determining that the withdrawal is due to a timeout event, PE router 10B deletes IGMP state (419A). PE router 10B stops forwarding traffic for the multicast group to the at least one receiver connected to CE router 8 so as to avoid leave/timeout latencies and exits the operation.

If one or both of the entry for PE router 10A and the BGP Type-1 route from PE router 10A do not exist ("NO" branch of 422 or "NO" branch of 424), then PE router 10B determines that the withdrawal of a BGP join synch route is due to a disruption event, such as a Peer Down or ESI Down event. Upon determining that the withdrawal is due to a disruption event, PE router 10B retains IGMP state (418C) and continues to forward traffic for the multicast group to the host so as to avoid traffic black holing. Furthermore, PE router 10B transmits a Group Specific Query (GSQ) to the hosts and receivers of customer network 6 via CE router 8 (426). Such a GSQ solicits the host or receiver to reissue IGMP refresh reports so as to reestablish relevant IGMP state in each of the PE routers 10 within the EVPN. The host or receiver reissues an IGMP refresh report to PE routers 10, and PE routers 10 that remain connected to CE router 8 so as to receive the IGMP refresh report may update IGMP state based on the IGMP refresh report.

Further, PE router 10B starts a state retain timer (428). Typically, the state retain timer has a duration of approximately two minutes or the length of time between IGMP refresh reports received from the host or receiver. PE router 10B determines whether it has received a BGP join synch route for the multicast group from the originating PE router while the state retain timer runs (408B). If PE router 10B has received such a BGP join synch route ("YES" branch of 408B), PE router 10 restarts the state retain timer (428). This may occur during a Peer Down disruption event (i.e., PE router 10A has rebooted and has resent the BGP join synch route). Thus, the state retain timer may help in avoiding unnecessary churn of LMQ messages and reports following a rebooting of PE router 10A. Further, the state retain timer may allow for the CFM service to update PE router 10B with revised network topology that takes into account offline ESI links and peers such that PE router 10B, upon receiving an IGMP refresh reports from the host or receiver, has sufficient time to recreate IGMP state. Further, if, during a Peer Down disruption event, the host or receiver issued a multicast group leave request that was lost (e.g., because CE router 8 sent the request to PE router 10A and PE router 10A is down), the state retain timer provides sufficient time for PE router 10B to receive an IGMP refresh report requested by the GSQ and converge to the desired state.

Upon expiration of the state retain timer ("YES" branch of 430), PE router 10B determines whether it possesses a BGP join synch route originated by a PE router other than PE router 10A (e.g., whether PE router 10B has a local IGMP state for the multicast group or has received a BGP join synch route from another PE router, such as PE router 10C) (404C). If PE router 10B possesses a BGP join synch route originated by a PE router other than PE router 10A ("YES" branch of 404C), PE router 10B retains its state (418B). PE router 10B continues to forward traffic for the multicast group to the at least one receiver connected to CE router 8 and exits the operation. If PE router 10B does not possess a BGP join synch route originated by a PE router other than PE router 10A ("NO" branch of 404C), PE router 10B deletes its IGMP state (419B). PE router 10B stops forwarding traffic for the multicast group to the at least one receiver connected to CE router 8 and exits the operation.

Accordingly, a PE router 10 of the present disclosure may receive a withdrawal of a BGP join synch route and detect the underlying reason for the withdrawals of the BGP join synch route. Such a PE router 10 may avoid black holing of multicast traffic when a disruption event on the ES occurs, while still allowing a host to gracefully withdraw from a multicast group without suffering withdrawal latency.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules, or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A method comprising:
    receiving, by a first provider edge (PE) router of a plurality of PE routers included in an Ethernet segment of an Ethernet Virtual Private Network (EVPN) and from a second PE router of the plurality of PE routers, a withdrawal of a Border Gateway Protocol (BGP) join synch route used to synchronize a join request for a multicast group across the Ethernet segment, wherein a customer edge (CE) router is multi-homed to the plurality of the PE routers over the Ethernet segment;
    in response to receiving the withdrawal of the BGP join synch route, determining, by the first PE router, whether the withdrawal of the BGP join synch route is due to a multicast state timeout event at the second PE router or a disruption event at the second PE router;
    upon determining that the withdrawal of the BGP join synch route is due to the disruption event at the second PE router, retaining, by the first PE router, a multicast state for the multicast group associated with the BGP join synch route, and forwarding, by the first PE router, multicast traffic of the multicast group toward at least one receiver connected to the CE router; and
    upon determining that the withdrawal of the BGP join synch route is due to the multicast state timeout event at the second PE router, deleting, by the first PE router, the multicast state for the multicast group associated with the BGP join synch route, and stopping, by the first PE router, forwarding of the multicast traffic of the multicast group.

2. The method of claim 1, wherein the disruption event at the second PE router comprises at least one of:
    a disruption of the second PE router; or
    a disruption of at least one link of the Ethernet segment between the second PE router and the CE router.

3. The method of claim 1, wherein the multicast state timeout event at the second PE router comprises at least one of:
    a default join timeout at the second PE router due to the join request for the multicast group not being refreshed by the at least one receiver; or
    a Last Member Query join timeout at the second PE router due to a leave request for the multicast group sent by the at least one receiver.

4. The method of claim 1, further comprising:
    in response to receiving the withdrawal of the BGP join synch route, determining, by the first PE router, whether the BGP join synch route within a routing information base (RIB) of the first PE router is originated by at least one PE router of the plurality of PE routers that is not the second PE router; and
    upon determining that the BGP join synch route within the RIB of the first PE router is originated by the at least one PE router of the plurality of PE routers that is not the second PE router, retaining, by the first PE router, the multicast state for the multicast group associated with the BGP join synch route within the RIB of the first PE router and forwarding, by the first PE router, multicast traffic of the multicast group toward the at least one receiver connected to the CE router.

5. The method of claim 4, wherein the at least one PE router of the plurality of PE routers that is not the second PE router is the first PE router.

6. The method of claim 4, wherein the at least one PE router of the plurality of PE routers that is not the second PE router is a third PE router that is different than the first PE router.

7. The method of claim 1, further comprising, in response to receiving the withdrawal of the BGP join synch route, starting, by the first PE router, a join withdraw timer;
    upon expiration of the join withdraw timer, determining, by the first PE router, whether the BGP join synch route within a routing information base (RIB) of the first PE router is originated by at least one PE router of the plurality of PE routers that is not the second PE router; and
    upon determining that the BGP join synch route within the RIB of the first PE router is originated by the at least one PE router of the plurality of PE routers that is not the second PE router, retaining, by the first PE router, the multicast state for the multicast group associated with the BGP join synch route within the RIB of the first PE router and forwarding, by the first PE router, multicast traffic of the multicast group toward the at least one receiver connected to the CE router.

8. The method of claim 7, further comprising:
    after starting the join withdraw timer and prior to expiration of the join withdraw timer, receiving, by the first PE router, a subsequent BGP join synch route used to synchronize a subsequent join request for the multicast group across the Ethernet segment, and
    in response to receiving the subsequent BGP join synch route, resetting, by the first PE router, the join withdraw timer.

9. The method of claim 1, wherein determining whether the withdrawal of the BGP join synch route is due to the multicast state timeout event at the second PE router or the disruption event at the second PE router comprises:
    upon determining that a routing information base (RIB) of the first PE router does not include the second PE router, determining, by the first PE router, that the withdrawal of the BGP join synch route is due to the disruption event at the second PE router;
    upon determining that the RIB of the first PE router does not include a BGP route for the Ethernet segment from the second PE router, determining, by the first PE router, that the withdrawal of the BGP join synch route is due to the disruption event at the second PE router; and
    upon determining that the RIB of the first PE router includes both the second PE router and the BGP route for the Ethernet segment from the second PE router, determining, by the first PE router, that the withdrawal of the BGP join synch route is due to the multicast state timeout event at the PE router.

10. The method of claim 1, further comprising, upon determining that the withdrawal of the BGP join synch route is due to the disruption event at the second PE router, issuing, by the first PE router, a group-specific query to the at least one receiver connected to the CE router to determine whether the at least one receiver is interested in receiving the multicast traffic of the multicast group associated with the BGP join synch route.

11. The method of claim 1, wherein, retaining the multicast state for the multicast group associated with the BGP join synch route comprises:
   upon determining that the withdrawal of the BGP join synch route is due to the disruption event at the second PE router, starting, by the first PE router, a state retain timer;
   upon expiration of the state retain timer, determining, by the first PE router, whether the BGP join synch route within a routing information base (RIB) of the first PE router is originated by at least one PE router of the plurality of PE routers that is not the second PE router;
   upon determining that the BGP join synch route within the RIB of the first PE router is originated by the at least one PE router of the plurality of PE routers that is not the second PE router, retaining, by the first PE router, the multicast state for the multicast group associated with the BGP join synch route within the RIB of the first PE router and forwarding, by the first PE router, multicast traffic of the multicast group toward the at least one receiver connected to the CE router; and
   upon determining that the BGP join synch route within the RIB of the first PE router is originated by the second PE router, deleting, by the first PE router, the multicast state for the multicast group associated with the BGP join synch route from the RIB of the first PE router and stopping, by the first PE router, forwarding of the multicast traffic of the multicast group.

12. The method of claim 11, further comprising:
   after starting the state retain timer and prior to expiration of the state retain timer, receiving, by the first PE router, a subsequent BGP join synch route used to synchronize a subsequent join request for the multicast group across the Ethernet segment, and
   in response to receiving the subsequent BGP join synch route, resetting, by the first PE router, the state retain timer.

13. A first provider edge (PE) router of a plurality of PE routers included in an Ethernet segment of an Ethernet Virtual Private Network (EVPN), configured to:
   receive, from a second PE router of the plurality of PE routers, a withdrawal of a Border Gateway Protocol (BGP) join synch route used to synchronize a join request for a multicast group across the Ethernet segment, wherein a customer edge (CE) router is multi-homed to the plurality of the PE routers over the Ethernet segment; and
   in response to receiving the withdrawal of the BGP join synch route, determine whether the withdrawal of the BGP join synch route is due to a multicast state timeout event at the second PE router or a disruption event at the second PE router;
   upon determining that the withdrawal of the BGP join synch route is due to the disruption event at the second PE router, retain a multicast state for the multicast group associated with the BGP join synch route, and forward multicast traffic of the multicast group toward at least one receiver connected to the CE router; and
   upon determining that the withdrawal of BGP join synch route is due to the multicast state timeout event at the second PE router, delete the multicast state for the multicast group associated with the BGP join synch route and stop forwarding of the multicast traffic of the multicast group.

14. The first PE router of claim 13, wherein the disruption event at the second PE router comprises at least one of:
   a disruption of the second PE router; or
   a disruption of at least one link of the Ethernet segment between the second PE router and the CE router.

15. The first PE router of claim 13, wherein the multicast state timeout event at the second PE router comprises at least one of:
   a default join timeout at the second PE router due to the join request for the multicast group not being refreshed by the at least one receiver; or
   a Last Member Query join timeout at the second PE router due to a leave request for the multicast group sent by the at least one receiver.

16. The first PE router of claim 13, further configured to:
   in response to receiving the withdrawal of the BGP join synch route, determine whether the BGP join synch route within a routing information base (RIB) of the first PE router is originated by at least one PE router of the plurality of PE routers that is not the second PE router; and
   upon determining that the BGP join synch route within the RIB of the first PE router is originated by the at least one PE router of the plurality of PE routers that is not the second PE router, retain the multicast state for the multicast group associated with the BGP join synch route within the RIB of the first PE router and forward multicast traffic of the multicast group toward the at least one receiver connected to the CE router.

17. The first PE router of claim 13, further configured to, in response to receiving the withdrawal of the BGP join synch route, start a join withdraw timer;
   upon expiration of the join withdraw timer, determine whether the BGP join synch route within a routing information base (RIB) of the first PE router is originated by at least one PE router of the plurality of PE routers that is not the second PE router; and
   upon determining that the BGP join synch route within the RIB of the first PE router is originated by the at least one PE router of the plurality of PE routers that is not the second PE router, retain the multicast state for the multicast group associated with the BGP join synch route within the RIB of the first PE router and forward multicast traffic of the multicast group toward the at least one receiver connected to the CE router.

18. The first PE router of claim 17, further configured to:
   after starting the join withdraw timer and prior to expiration of the join withdraw timer, receive a subsequent BGP join synch route used to synchronize a subsequent join request for the multicast group across the Ethernet segment, and
   in response to receiving the subsequent BGP join synch route, reset the join withdraw timer.

19. The first PE router of claim 13, wherein, to determine whether the withdrawal of the BGP join synch route is due to the multicast state timeout event at the second PE router or the disruption event at the second PE router, the first PE router is further configured to:
   upon determining that a routing information base (RIB) of the first PE router does not include the second PE router, determine that the withdrawal of the BGP join synch route is due to the disruption event at the second PE router;
   upon determining that the RIB of the first PE router does not include a BGP route for the Ethernet segment from the second PE router, determine that the withdrawal of the BGP join synch route is due to the disruption event at the second PE router; and upon determining that the RIB of the first PE router includes both the second PE router and the BGP route for the Ethernet segment from the second PE router, determine that the withdrawal of the BGP join synch route is due to the multicast state timeout event at the PE router.

20. The first PE router of claim 13, further configured to, upon determining that the withdrawal of the BGP join synch route is due to the disruption event at the second PE router, issue a group-specific query to the at least one receiver connected to the CE router to determine whether the at least one receiver is interested in receiving the multicast traffic of the multicast group associated with the BGP join synch route.

21. The first PE router of claim 13, wherein, to retain the multicast state for the multicast group associated with the BGP join synch route, the PE router is further configured to:

upon determining that the withdrawal of the BGP join synch route is due to the disruption event at the second PE router, start a state retain timer;

upon expiration of the state retain timer, determine whether the BGP join synch route within a routing information base (RIB) of the first PE router is originated by at least one PE router of the plurality of PE routers that is not the second PE router;

upon determining that the BGP join synch route within the RIB of the first PE router is originated by the at least one PE router of the plurality of PE routers that is not the second PE router, retain the multicast state for the multicast group associated with the BGP join synch route within the RIB of the first PE router and forward multicast traffic of the multicast group toward the at least one receiver connected to the CE router; and upon determining that the BGP join synch route within the RIB of the first PE router is originated by the second PE router, delete the multicast state for the multicast group associated with the BGP join synch route from the RIB of the first PE router and stop forwarding of the multicast traffic of the multicast group.

22. The first PE router of claim 21, further configured to:

after starting the state retain timer and prior to expiration of the state retain timer, receive a subsequent BGP join synch route used to synchronize a subsequent join request for the multicast group across the Ethernet segment, and in response to receiving the subsequent BGP join synch route, reset the state retain timer.

23. A non-transitory computer readable medium comprising instructions that, when executed, are configured to cause a first provider edge (PE) router of a plurality of PE routers included in an Ethernet segment of an Ethernet Virtual Private Network (EVPN), to:

receive, from a second PE router of the plurality of PE routers, a withdrawal of a Border Gateway Protocol (BGP) join synch route used to synchronize a join request for a multicast group across the Ethernet segment, wherein a customer edge (CE) router is multi-homed to the plurality of the PE routers over the Ethernet segment; and in response to receiving the withdrawal of the BGP join synch route, determine whether the withdrawal of the BGP join synch route is due to a multicast state timeout event at the second PE router or a disruption event at the second PE router;

upon determining that the withdrawal of the BGP join synch route is due to the disruption event at the second PE router, retain a multicast state for the multicast group associated with the BGP join synch route, and forward multicast traffic of the multicast group toward at least one receiver connected to the CE router; and upon determining that the withdrawal of BGP join synch route is due to the multicast state timeout event at the second PE router, delete the multicast state for the multicast group associated with the BGP join synch route and stop forwarding of the multicast traffic of the multicast group.

24. The computer readable medium of claim 23, wherein, to determine whether the withdrawal of the BGP join synch route is due to the multicast state timeout event at the second PE router or the disruption event at the PE router, the computer readable medium further comprises instructions that, when executed, are configured to cause the first PE router to:

upon determining that a routing information base (RIB) of the first PE router does not include the second PE router, determine that the withdrawal of the BGP join synch route is due to the disruption event at the second PE router;

upon determining that the RIB of the first PE router does not include a BGP route for the Ethernet segment from the second PE router, determine that the withdrawal of the BGP join synch route is due to the disruption event at the second PE router; and upon determining that the RIB of the first PE router includes both the second PE router and the BGP route for the Ethernet segment from the second PE router, determine that the withdrawal of the BGP join synch route is due to the multicast state timeout event at the PE router.

* * * * *